(12) United States Patent  
Ramchandani et al.

(10) Patent No.: US 9,276,867 B2  
(45) Date of Patent: Mar. 1, 2016

(54) HIERARCHICAL SCHEDULING SYSTEM WITH LAYER BYPASS INCLUDING UPDATING SCHEDULING INFORMATION OF A SCHEDULING LAYER FOR EACH ITEM WHETHER OR NOT IT BYPASSES THE SCHEDULING LAYER

(71) Applicants: Ratan Ramchandani, Los Altos, CA (US); Sreedhar Ravipalli, Cupertino, CA (US); Mohammed Ismael Tatar, Ontario (CA)

(72) Inventors: Ratan Ramchandani, Los Altos, CA (US); Sreedhar Ravipalli, Cupertino, CA (US); Mohammed Ismael Tatar, Ontario (CA)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 13/929,779

(22) Filed: Jun. 28, 2013

(65) Prior Publication Data

US 2015/0006692 A1    Jan. 1, 2015

(51) Int. Cl.
| | |
|---|---|
| G06F 13/00 | (2006.01) |
| H04L 12/869 | (2013.01) |
| H04L 12/751 | (2013.01) |
| H04L 12/891 | (2013.01) |
| H04L 12/863 | (2013.01) |

(52) U.S. Cl.  
CPC .............. H04L 47/60 (2013.01); H04L 45/02 (2013.01); H04L 47/41 (2013.01); H04L 47/624 (2013.01)

(58) Field of Classification Search  
CPC .............. H04L 41/0213; H04L 29/08072; H04L 29/06; H04L 41/22; H04L 41/12; H04L 12/5693; H04L 2012/5679; H04L 47/10; H04L 2012/5651; H04L 45/02; H04L 47/41; H04Q 11/0478

USPC ........................ 370/395.4; 709/223  
See application file for complete search history.

(56) References Cited

U.S. PATENT DOCUMENTS

| 6,721,796 | B1 * | 4/2004 | Wong .............................. 709/232 |
| 7,522,609 | B2 | 4/2009 | Cohen et al. |
| 7,583,678 | B1 | 9/2009 | Levy et al. |
| 7,876,763 | B2 | 1/2011 | Cohen et al. |
| 8,325,736 | B2 | 12/2012 | Cohen et al. |
| 2005/0152374 | A1 * | 7/2005 | Cohen et al. ............... 370/395.4 |
| 2009/0207846 | A1 * | 8/2009 | Cohen et al. ............... 370/395.4 |
| 2010/0061234 | A1 * | 3/2010 | Pai et al. .................... 370/230.1 |
| 2011/0158254 | A1 * | 6/2011 | Basso et al. .................. 370/468 |
| 2011/0255551 | A1 * | 10/2011 | Venables ...................... 370/412 |
| 2012/0023498 | A1 * | 1/2012 | Sundararaman et al. ...... 718/102 |
| 2012/0257527 | A1 * | 10/2012 | Jorgensen ..................... 370/252 |

* cited by examiner

*Primary Examiner* — Robert B Harrell  
(74) *Attorney, Agent, or Firm* — The Law Office of Kirk D. Williams

(57) ABSTRACT

In one embodiment, a hierarchical scheduling system including multiple scheduling layers with layer bypass is used to schedule items (e.g., corresponding to packets). This scheduling of items performed in one embodiment includes: propagating first items through the hierarchical scheduling system and updating scheduling information in each of the plurality of scheduling layers based on said propagated first items as said propagated first items propagate through the plurality of scheduling layers, and bypassing one or more scheduling layers of the plurality of scheduling layers for scheduling bypassing items and updating scheduling information in each of said bypassed one or more scheduling layers based on said bypassing items. In one embodiment, this method is performed by a particular machine. In one embodiment, the operations of propagating first items through the hierarchical scheduling system and bypassing one or more scheduling layers are done in parallel.

20 Claims, 3 Drawing Sheets

HIERARCHICAL SCHEDULING SYSTEM WITH LAYER BYPASS INCLUDING UPDATING SCHEDULING INFORMATION OF A SCHEDULING LAYER FOR EACH ITEM WHETHER OR NOT IT BYPASSES THE SCHEDULING LAYER

TECHNICAL FIELD

The present disclosure relates generally to scheduling systems, such as, but not limited to packet schedulers used in a communications device of a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Packet switching devices determine the order of packets processed by, and sent from, a packet switching device typically based on a number of parameters including different Quality of Service (QoS) for different types of packet traffic. A scheduling system typically consists of a cone (tree) of scheduling decision points starting with the queues at the top and working through several layers of hierarchy down to a root decision. Each layer typically corresponds to different grouping, such as, but not limited to, subscribers, VLANs, ports, interfaces, etc. At each node in the scheduling system, service is distributed typically based on configured QoS parameters such as, but not limited to, minimum and maximum rates, excess bandwidth sharing, priority level(s), and propagation characteristics.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
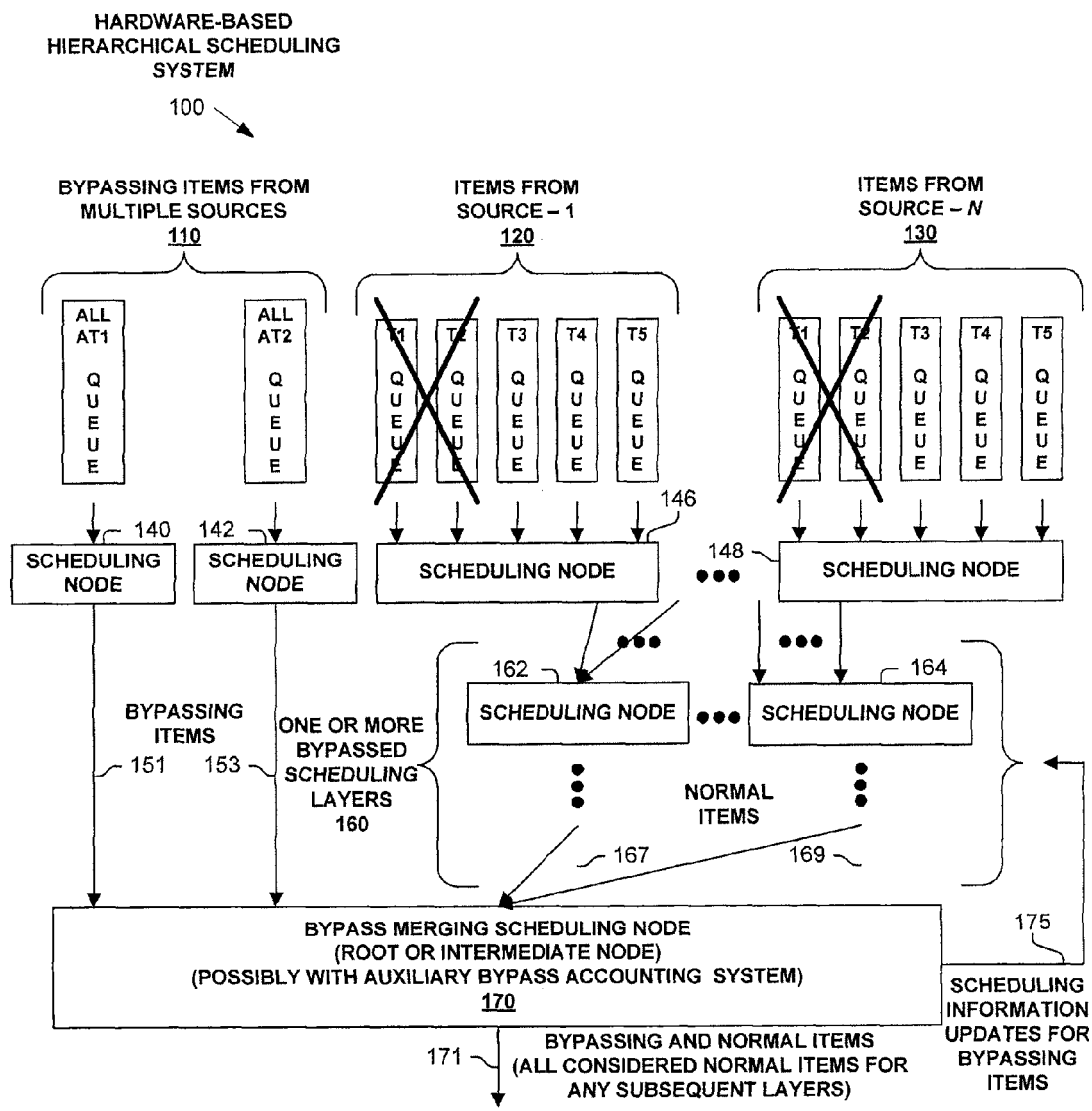
FIG. 1 illustrates a hierarchical scheduling system according to one embodiment.

Disclosed are, inter alia, methods, apparatus, computer-storage media, mechanisms, and means associated with a hierarchical scheduling system including multiple scheduling layers with layer bypass. One embodiment includes scheduling items using a hierarchical scheduling system including a plurality of scheduling layers. In one embodiment, this scheduling of items includes: propagating first items through the hierarchical scheduling system and updating scheduling information in each of the plurality of scheduling layers based on said propagated first items as the propagated first items propagate through the plurality of scheduling layers, and bypassing one or more scheduling layers of the plurality of scheduling layers for scheduling bypassing items and updating scheduling information in each of said bypassed one or more scheduling layers based on said bypassing items. In one embodiment, this method is performed by a particular machine. In one embodiment, the operations of propagating first items through the hierarchical scheduling system and bypassing one or more scheduling layers are done in parallel.

2. Description

Disclosed are, inter alia, methods, apparatus, computer-storage media, mechanisms, and means associated with a hierarchical scheduling system including multiple scheduling layers with layer bypass. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps or operations, refers to a particular machine within the 35 USC §101 machine statutory class.

In a traditional hierarchical scheduling system, each subscriber has a number of queues with different QoS characteristics (one or more priority levels, guaranteed minimum rate, best effort, etc.). The scheduling hierarchy between the scheduling system's input queues and the scheduler's output (e.g., to a port) typically involve several layers. The number of subscribers, and hence input queues, that eventually converge into that port is fairly large.

Unlike traditional traffic that goes through three-parameter accounting at each scheduling node (minimum rate, maximum rate, excess bandwidth share), priority traffic merely has priority over lower priority levels and accounts against the maximum rate (shaping) for each hierarchical node that it traverses and that has maximum shaping enabled on it. Also, each subscriber's priority traffic alone (i.e. in the absence of any guaranteed minimum rate or best effort traffic) does not exceed the maximum rates of the traversed nodes (possibly policed prior to enqueuing into the scheduling system).

One embodiment, for the required number of priority levels, aggregates all the subscribers' priority traffic into single per priority level queues. In one embodiment, one or more traffic types other than, or in addition to, priority are aggregated.

In one embodiment, if each subscriber had a priority P1 queue, priority P2 queue, and several lower priority queues, then the individual P1 and P2 queues per subscriber are replaced with a single aggregated P1 queue and a single aggregated P2 queue that accumulate all the subscribers' P1 and P2 priority traffic respectively. These aggregate queues are connected such that one or more of the hierarchy layers are bypassed (e.g., connected to the port layer of the scheduling system, bypassing all the intermediate hierarchy layers, bypassing one or more but less than all intermediate hierarchy layers). As traffic is scheduled out of the scheduling system, if it is identified as originating from one of these aggregate queues, then the corresponding scheduling information (e.g., data lengths) is fed back to the bypassed layers (such as via an auxiliary accounting system) with an indication of which subscriber each data burst belongs or the particular bypassed nodes to update. In one embodiment, the accounting system looks up the scheduling hierarchy for that subscriber, and uses a side mechanism to perform the maximum rate shaping accounting updates for all the actual bypassed nodes (in contrast if it flowed through the layers that subscriber's traffic flows though). In one embodiment, this accounting system mechanism does not use the available decision bandwidth of the main scheduling hierarchy and is not latency critical.

One embodiment replaces a large number (e.g., tens of thousands) of queues with a small number of queues (e.g., one, two) for each output port. For example, if there are 64,000 subscribers, each with a P1 and P2 queue, eventually feeding to ports, then the 128,000 priority queues are implemented in hardware by just two queues (P1 and P2) per port. This allows easier scaling to support several more priority levels (e.g., eight) per subscriber. Also, by aggregating the potentially dribbled high priority traffic (e.g., traffic that per individual flow does not form large bursts) into bursts, the decision making computation bandwidth on the scheduling system hardware is reduced. Also, by applying maximum rate shapers on the aggregate priority queues, coupled shaping is supported in one embodiment. If a particular priority level has used its maximum bandwidth in one embodiment, this single queue will be blocked, thereby blocking all subscribers' traffic of that priority level (e.g., instead of having to block in multiple scheduling nodes).

In one embodiment, high priority traffic to all subscribers is aggregated into a small set of queues (one per priority level) to reduce the number of physical queues implemented in hardware as well as the latency for priority traffic. Per subscriber accounting for this priority traffic is performed after transmission in a non-critical feedback path. This also allows QoS policies to be applied on the aggregate of each priority level in addition to the normal per subscriber and per VLAN QoS policies.

Turning to the figures, FIG. 1 illustrates a hardware-based hierarchical scheduling system 100 operating according to one embodiment. The term "hardware-based" refers to at least partially or fully implemented in hardware (e.g., some hardware may be under firmware control). In one embodiment, hierarchical scheduling system 100 is implemented (with or without queues 110, 120, 130) on a single integrated circuit. The term "items" refers to scheduling items that propagate through the hierarchical scheduling system 100, with these items corresponding to packets, a processing duration, or other scheduled entity.

Shown in FIG. 1, are N sources, source-1 (120) to source-N (130), which in one embodiment correspond to different subscribers. Each source-1 (120) to source-N (130) may have scheduling items of multiple scheduling categories, such as, but not limited to, one or more priority level(s), minimum rates, maximum rates, and excess bandwidth sharing. For illustrative purposes, FIG. 1 represents that there are five different traffic types T1-T5 (with one embodiment having more or less traffic types). In prior scheduling systems, all five traffic types would enter a same first-level scheduling node.

The term "bypassing item" is used herein to refer to an item that bypasses one or more scheduling layers 160 within hierarchical scheduling system 100. The term "normal item" is used herein to refer to an item that propagates through scheduling layers 160 within hierarchical scheduling system 100.

In one embodiment, one or more of these different traffic types are aggregated from one or more, possibly all, of source-1 (120) to source-N (130) as illustrated by bypassing items from multiple sources 110. In one embodiment, two traffic types (T1 and T2) are aggregated with each entering into a different first scheduling node 140, 142. FIG. 1 is annotated to illustrate that T1 and T2 traffic types do not enter scheduling nodes 146, 148 as done by prior scheduling systems. In one embodiment, at least one of traffic types T1 and T2 corresponds to a priority traffic type.

Bypassing items (151, 153) are scheduled and communicated to bypassing merging scheduling node 170 without going through one or more scheduling layers 160. Normal items (167, 169) are scheduled and communicated to bypassing merging scheduling node 170 having propagated through one or more scheduling layers 160 (e.g., a scheduling node 162 or 164). In one embodiment, scheduling node 170 is a root node of hierarchical scheduling system 100. In one embodiment, scheduling node 170 is a not root node of hierarchical scheduling system 100 (e.g., hierarchical scheduling system 100 is a subsystem of a larger hierarchical scheduling system). Scheduling node 170 schedules bypassing items 151, 153 and normal items 167, 169, resulting in scheduled bypassing and normal items 171. For terminology purposes, all items 171 are considered as normal items for any subsequent layers (unless they are split apart into bypassing and normal items by a subsequent layer).

In addition to having bypassing and normal items scheduled by hierarchical scheduling system 100, one embodiment updates scheduling information in scheduling nodes (162, 164) in one or more bypassed scheduling layers 160 to reflect the scheduling of bypassing items (151, 153) as indicated by scheduling information updates for bypassing items 175 being communicated to one or more bypassed scheduling layers 160.

For example, source-1 120 might have a configured overall maximum rate that is not only dependent on traffic of types T3, T4 and T5, but is also dependent on traffic of bypassing traffic types T1 and T2 from source-1 120. In one embodiment in response to a particular bypassing item (151, 153) whose source was source-1 120 being received or scheduled by bypass merging scheduling node 170, scheduling node(s) (including 162) of one or more bypassed scheduling layers 160 that normal items from source-1 120 propagate through are updated based on the particular bypassing item (e.g., based on its data or scheduled length). In this way, certain bypassing items can bypass one or more scheduling layers 160, but the scheduling information in scheduling nodes within one or more scheduling layers 160 is updated based on the scheduled bypassing items. Therefore, normal items will be scheduled according to scheduling information from corresponding normal items 167, 169 and bypassing items 151, 153. In one embodiment, the scheduling layer including scheduling node 146 is also updated based on the scheduled bypassing items.

In one embodiment, an auxiliary bypass accounting system is used to collect scheduling information about bypassing items 151, 153 being received or scheduled by bypass merging scheduling node 170. This auxiliary bypass account system can correlate and smartly (e.g., accumulate and timely) provide scheduling information updates 175 for bypassing items being communicated to one or more bypassed scheduling layers 160 so as to not impact the processing of scheduling nodes of one or more bypassed scheduling layers 160.

Figure 2:
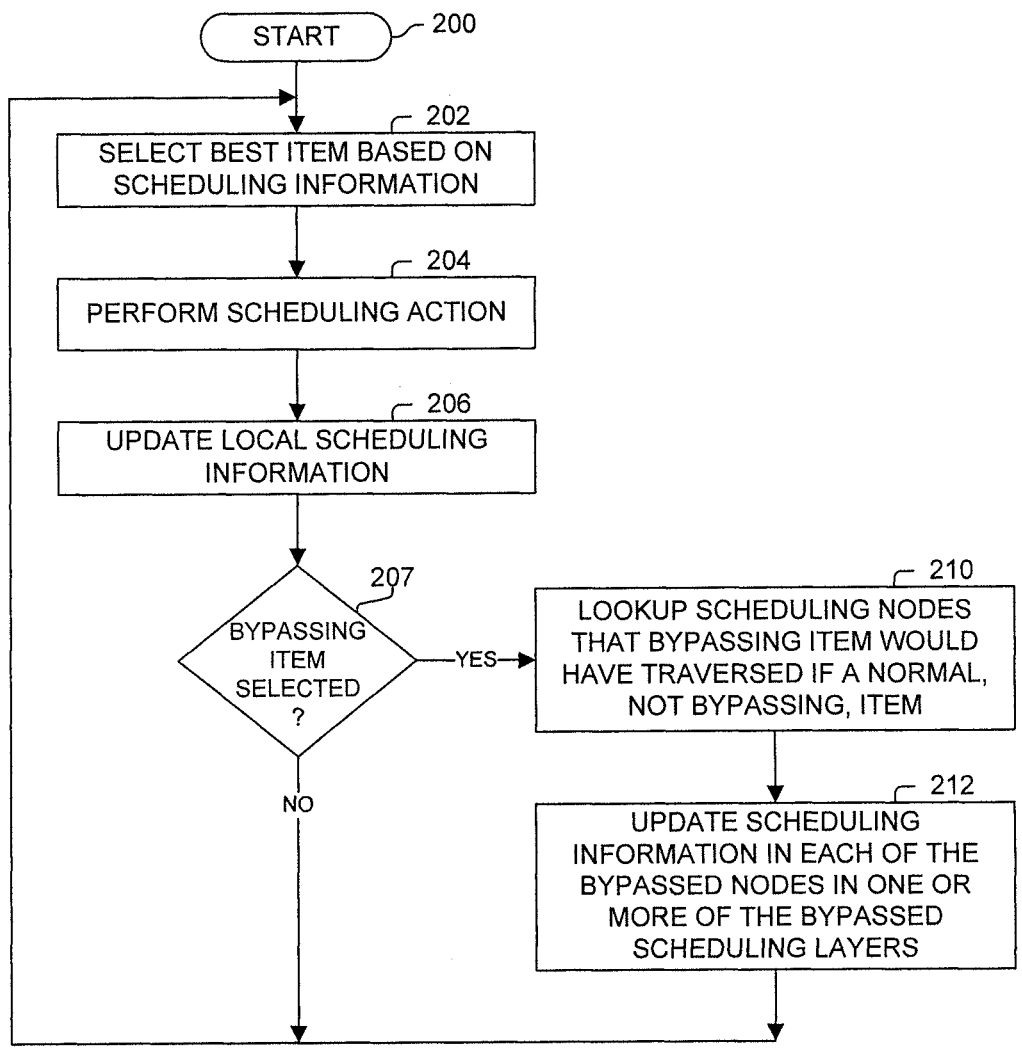
FIG. 2 illustrates a process according to one embodiment.

FIG. 2 illustrates a process performed in one embodiment by a scheduling node (and possibly process blocks 210-212 by an auxiliary accounting system) of a hierarchical scheduling system including multiple scheduling layers with layer bypass. Processing begins with process block 200. In process block 202, a best item is selected based on the current scheduling information. In process block 204, the scheduling action is performed. In process block 206, the local scheduling information is updated. As determined in process block 207, if the selected and scheduled item is not a bypassing item, then processing returns to process block 202.

Otherwise, it was determined in process block 207 that the selected and scheduled item is a bypassing item, and processing proceeds to process block 210. In process block 210, information concerning the bypassing item is retrieved to identify particular scheduling node(s) that were bypassed (e.g., those scheduling node(s) that were not traversed/by- passed but would have been traversed if it was a normal item). In process block 212, the scheduling information is updated (directly or given to an auxiliary accounting system to update in due course) in each of these particular scheduling node(s) based on the bypassing item selected in process block 202. Processing returns to process block 202.

Figure 3A:
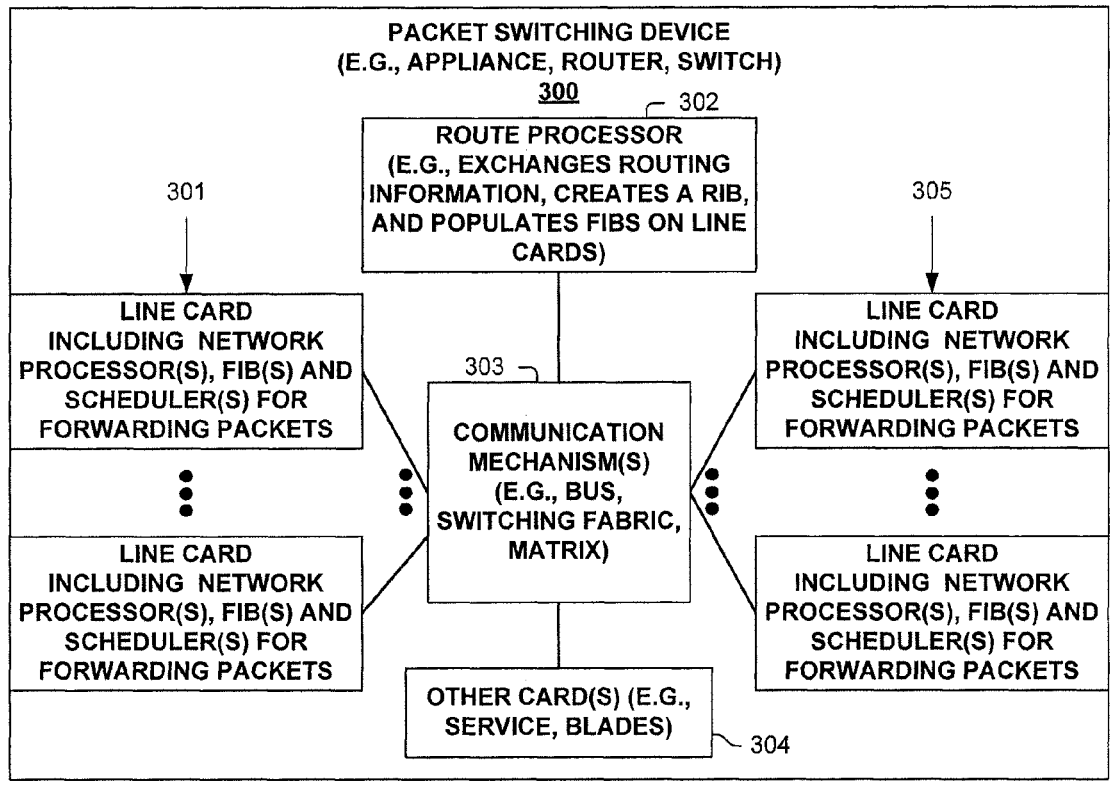
FIG. 3A illustrates a packet switching device according to one embodiment.

One embodiment of a packet switching device 300 (e.g., one example of a network node using one or more hierarchical scheduling systems including multiple scheduling layers with layer bypass) is illustrated in FIG. 3A. As shown, packet switching device 300 includes multiple line cards 301 and 305, each with one or more network interfaces for sending and receiving packets over communications links, and with one or more processing elements that are used in one embodiment with a hierarchical scheduling system with layer bypass. In one embodiment, one or more (and possibly all) line cards 301 and 305 include one or more hierarchical scheduling systems including multiple scheduling layers with layer bypass for scheduling packets.

Packet switching device 300 also has a control plane with one or more processing elements 302 for managing the control plane and/or control plane processing of packets associated with a hierarchical scheduling system including multiple scheduling layers with layer bypass. Packet switching device 300 also includes other cards 304 (e.g., service cards, blades) which include processing elements that are used in one embodiment to process packets associated with a hierarchical scheduling system including multiple scheduling layers with layer bypass, and some communication mechanism 303 (e.g., bus, switching fabric, matrix) for allowing its different entities 301, 302, 304 and 305 to communicate.

Figure 3B:
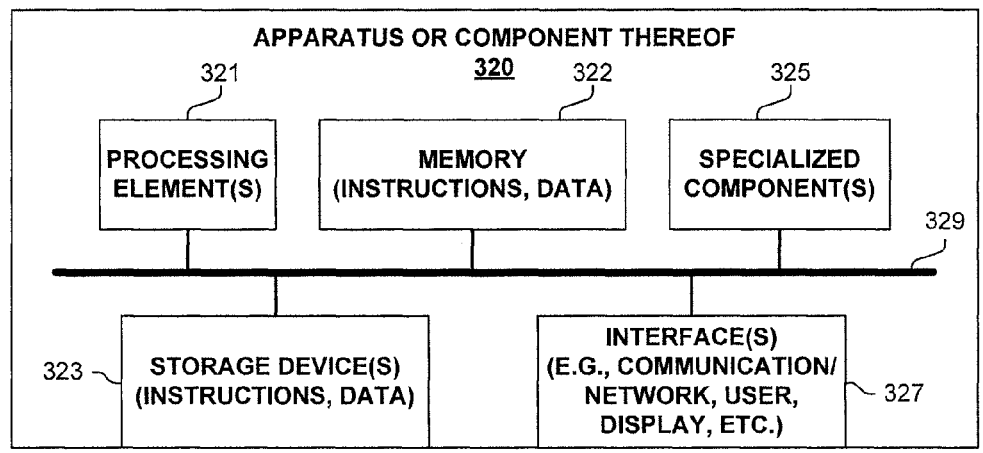
FIG. 3B illustrates an apparatus according to one embodiment.

FIG. 3B is a block diagram of an apparatus 320 used in one embodiment associated with a hierarchical scheduling system including multiple scheduling layers with layer bypass. In one embodiment, apparatus 320 performs one or more processes, or portions thereof, corresponding to one of the flow diagrams illustrated or otherwise described herein, and/or illustrated in another diagram or otherwise described herein.

In one embodiment, apparatus 320 includes one or more processing element(s) 321, memory 322, storage device(s) 323, specialized component(s) 325 (e.g. optimized hardware such as for performing lookup, scheduling, and/or packet processing operations, etc.), and interface(s) 327 for communicating information (e.g., sending and receiving packets, user-interfaces, displaying information, etc.), which are typically communicatively coupled via one or more communications mechanisms 329, with the communications paths typically tailored to meet the needs of a particular application.

Various embodiments of apparatus 320 may include more or fewer elements. The operation of apparatus 320 is typically controlled by processing element(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processing element(s) 321 and/or data which is manipulated by processing element(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processing element(s) 321 and/or data which is manipulated by processing element(s) 321 for implementing functionality in accordance with an embodiment.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
scheduling items of a first source using a hierarchical scheduling system including a plurality of scheduling layers implemented using scheduling circuitry, with said items of the first source including a plurality of first items and a plurality of bypassing items, wherein said scheduling items of the first source includes:
propagating the plurality of first items through the hierarchical scheduling system through propagating circuitry of said scheduling circuitry and updating scheduling information associated with the first source in each of the plurality of scheduling layers based on said propagated first items as said propagated first items propagate through the plurality of scheduling layers, and
propagating the plurality of bypassing items through the hierarchical scheduling system through propagating and bypassing circuitry of said scheduling circuitry, with said propagating the plurality of bypassing items including bypassing one or more scheduling layers of the plurality of scheduling layers and updating scheduling information associated with the first source based on said bypassing items in each of said bypassed one or more scheduling layers and in each of the plurality of scheduling layers actually through which said bypassing items propagated;
wherein the method is performed by a particular machine using a hardware-based said hierarchical scheduling system; and wherein said operations of propagating the plurality of first items and the plurality of bypassing items through the hierarchical scheduling system are done in parallel.

2. The method of claim 1, wherein the hierarchical scheduling system includes a particular scheduler; and wherein said updating scheduling information in each of the plurality of scheduling layers based on said bypassing items includes updating each of the plurality of scheduling layers in response to a particular bypassing item of said bypassing items being scheduled by the particular scheduler.

3. The method of claim 2, wherein the particular scheduler is a root scheduler of the hierarchical scheduling system.

4. The method of claim 2, wherein the particular scheduler is not a root scheduler of the hierarchical scheduling system.

5. The method of claim 1, wherein the first items are of one or more first scheduling categories and bypassing items are of one or more second scheduling categories.

6. The method of claim 5, wherein at least one of said one or more second scheduling categories is high-priority traffic; and wherein at least one of said one or more first scheduling categories is minimum rate traffic.

7. The method of claim 1, wherein the particular machine is an integrated circuit containing the hierarchical scheduling system.

8. The method of claim 1, wherein said items correspond to packets.

9. The method of claim 1, wherein said bypassing one or more scheduling layers includes bypassing at least two of the plurality of scheduling layers.

10. An apparatus, comprising:
a hierarchical scheduling system including a plurality of scheduling layers comprising hardware circuitry-based scheduling nodes configured to schedule normal items, and to schedule bypass items bypassing one or more of the plurality of scheduling layers including bypassing a first particular scheduling layer; wherein the hierarchical scheduling system includes scheduling and bypassing and merging and updating scheduling information circuitry including
a particular scheduling node of the first particular scheduling layer, wherein the particular scheduling node is configured to propagate scheduled normal items to a next layer of the plurality of scheduling layers and to update scheduling information used by the particular scheduling node in scheduling said normal items; and
a bypass merging scheduling node of a second particular scheduling layer of the hierarchical scheduling system, wherein the bypass merging node is configured to receive and schedule both said bypass items, and said propagated scheduled normal items received directly from the particular scheduling node or after passing through one or more of the plurality of scheduling layers;
wherein the hierarchical scheduling system is configured to update said scheduling information used by the particular scheduling node based on said bypass items being scheduled by the bypass merging scheduling node despite said bypass items not propagating through the particular scheduling node.

11. The apparatus of claim 10, wherein said bypass items bypass at least two scheduling layers of the plurality of scheduling layers.

12. The apparatus of claim 10, wherein the bypass merging scheduling node is a root scheduler of the hierarchical scheduling system.

13. The apparatus of claim 10, wherein said bypass items correspond to one or more levels of high-priority traffic.

14. The apparatus of claim 10, wherein the bypass merging scheduling node is configured to shape the flow of said bypass items from the bypass merging scheduling node.

15. The apparatus of claim 10, wherein said normal items and said bypass items correspond to packets from a same source.

16. An apparatus, comprising:
a hierarchical scheduling system including a plurality of scheduling layers implemented using scheduling circuitry comprising hardware-based scheduling nodes configured to schedule items including a plurality of first items and a plurality of bypassing items; wherein the hierarchical scheduling system includes:
propagating circuitry to propagate the plurality of first items of one or more first scheduling categories through the hierarchical scheduling system and scheduling information updating circuitry to update scheduling information in each of the plurality of scheduling layers based on said propagated first items as said propagated first items propagate through the plurality of scheduling layers, and bypassing circuitry to bypass one or more scheduling layers of the plurality of scheduling layers for scheduling bypassing items of one or more second scheduling categories and bypassing scheduling information updating circuitry to update scheduling information in each of said one or more scheduling layers said bypassed based on said bypassing items.

17. The apparatus of claim 16, wherein said propagating first items through the hierarchical scheduling system and bypassing one or more scheduling layers are done in parallel.

18. The apparatus of claim 16, wherein said bypassing one or more scheduling layers includes bypassing at least two of the plurality of scheduling layers.

19. The apparatus of claim 16, wherein said items correspond to packets.

20. The apparatus of claim 16, wherein said one or more second scheduling categories consists of one or more priority levels of high-priority traffic.

* * * * *